United States Patent [19]

Taylor, Jr. et al.

[11] 4,081,898

[45] Apr. 4, 1978

[54] METHOD OF MANUFACTURING AN ELECTRONIC CALCULATOR UTILIZING A FLEXIBLE CARRIER

[75] Inventors: James B. Taylor, Jr., Plano; Galen F. Fritz, Houston, both of Tex.

[73] Assignee: Texas Instruments Incorporated, Dallas, Tex.

[21] Appl. No.: 683,366

[22] Filed: May 5, 1976

Related U.S. Application Data

[63] Continuation-in-part of Ser. No. 678,103, Apr. 19, 1976, abandoned.

[51] Int. Cl.² .......................................... H01H 11/00
[52] U.S. Cl. ...................... 29/622; 29/626; 174/68.5; 200/5 A; 200/159 B; 364/712
[58] Field of Search .............. 29/622, 624, 625, 626, 29/627, 628, 593, 577; 156/87, 228, 230, 232, 285, 286, 311, 382; 200/1 R, 5 R, 5 A, 11 R, 11 G, 11 H, 11 J, 11 K, 11 D, 159 B, 166 BH, 17 C; 340/365 A; 179/90 K

[56] References Cited

U.S. PATENT DOCUMENTS

| | | | |
|---|---|---|---|
| 3,722,086 | 3/1973 | Wikkerink et al. | 29/622 |
| 3,810,301 | 5/1974 | Cook | 29/593 |
| 3,860,771 | 1/1975 | Lynn et al. | 200/5 A |
| 3,898,421 | 8/1975 | Sizumura | 200/159 B |
| 3,911,234 | 10/1975 | Kotaka | 200/5 A |
| 3,971,127 | 7/1976 | Giguere et al. | 29/626 |

*Primary Examiner*—Victor A. DiPalma
*Attorney, Agent, or Firm*—Rene' E. Grossman; James T. Comfort; Richard P. Berg

[57] ABSTRACT

Electronic calculators are manufactured by use of a flexible insulative carrier, the carrier being a tape-like-plastic substrate a single length of which is sufficient to manufacture a plurality of the electronic calculators, wherein conductor patterns are formed on the carrier, a keyboard is formed on the carrier using selected portions of the aforementioned conductors as keyboard switch contacts and semiconductor devices are interconnected with selected conductors formed on the carrier.

26 Claims, 13 Drawing Figures

METHOD OF MANUFACTURING AN ELECTRONIC CALCULATOR UTILIZING A FLEXIBLE CARRIER

This is a continuation in part of application Ser. No. 678,103 filed Apr. 19, 1976 now abandoned.

This invention relates to improvements in methods of manufacturing an electronic calculator and specifically to the method of manufacturing an electronic calculator using a flexible carrier. Illustrative of the prior art methods of manufacturing an electronic calculator are those methods which relied upon the use of relatively rigid printed wiring boards, having conductors formed thereon typically by subtractive technology and occasionally by additive technology, with conventionally packaged semiconductor devices, such as the dual-in-line package devices, mounted thereon and a keyboard similar to those disclosed in U.S. Pat. No. 3,806,673 or U.S. patent application Ser. No. 644,206 filed Dec. 24, 1975. Additionally, in the prior art, it was not uncommon that electronic calculators employed a plurality of discrete electrical devices in addition to the one or more semiconductive devices. Also in the prior art, relatively simple circuits, having, for instance, a single semiconductive chip but, not having a keyboard or display devices, have been implemented on a flexible carrier.

The prior art method of manufacturing an electronic calculator utilizes components having relatively high costs and uses a method associated with such components which is relatively labor intensive, that is, requires a relatively large amount of human effort. Recently, great strides have taken place in consolidating the number of electrical devices into a minimum number of semiconductor chips, thereby reducing the cost of the electronic components in an electronic calculator. Relatively few advances, however, have been made in the art of assembling these electronic components, including a keyboard, into an electronic calculator. The aforementioned advances in semiconductor chip technology have resulted in decreasing the cost of manufacturing the electronic calculator thereby making the electronic calculator more attractive commercially.

In order further to increase the market for the electronic calculators, it is necessary that the cost associated with manufacturing be reduced. This can be accomplished by utilizing improved methods of manufacture.

It is therefore one object of this invention to improve the method of manufacturing electronic calculators.

It is another object of this invention to reduce the amount of human effort involved in manufacturing an electronic calculator.

It is yet another object of this invention to manufacture electronic calculators according to a method adapted for mass production.

It is still yet another object of this invention to utilize electrical components or subcomponents adaptable for use in a mass production method of manufacturing an electronic calculator.

The foregoing objects are achieved as is now described. Generally, in accordance with a preferred embodiment of the invention, a plurality of identical adherent conductive circuit patterns are formed on a flexible insulative carrier, each of the patterns being a predetermined arrangement of interconnective conductors, such as that utilized in an electronic calculator. A keyboard is then formed upon the carrier utilizing selected portions of the conductors as key switch contacts by deforming the carrier in selected areas to create a plurality of protuberances and folding the portion of the carrier, for instance, that portion including the protuberances, back generally on itself such that the conductors forming the key switch contacts make electrical connection when the associated protuberance is depressed. A plurality of semiconductive devices (preferably tape-mounted) including logic and display devices are then attached to the carrier in proper registration with the conductors formed thereon. The carrier can then be divided into separate calculator circuits, including integral keyboards, which can then be installed in a case and interconnected with a source of electrical energy to produce an electronic calculator. This use of a carrier in the method of manufacture makes the process readily adaptable for use with machinery requiring less human effort than the prior art required, thus resulting in lower production costs. The individual calculator circuits may be automatically tested at several points in the production process.

IN THE DRAWINGS

FIG. 4b depicts an alternate embodiment of the carrier as depicted in FIG. 4a;

FIG. 7 is a sectional side view through two switches of a keyboard formed in the carrier, as is shown in FIG. 4a;

DETAILED DESCRIPTION

Figure 1:
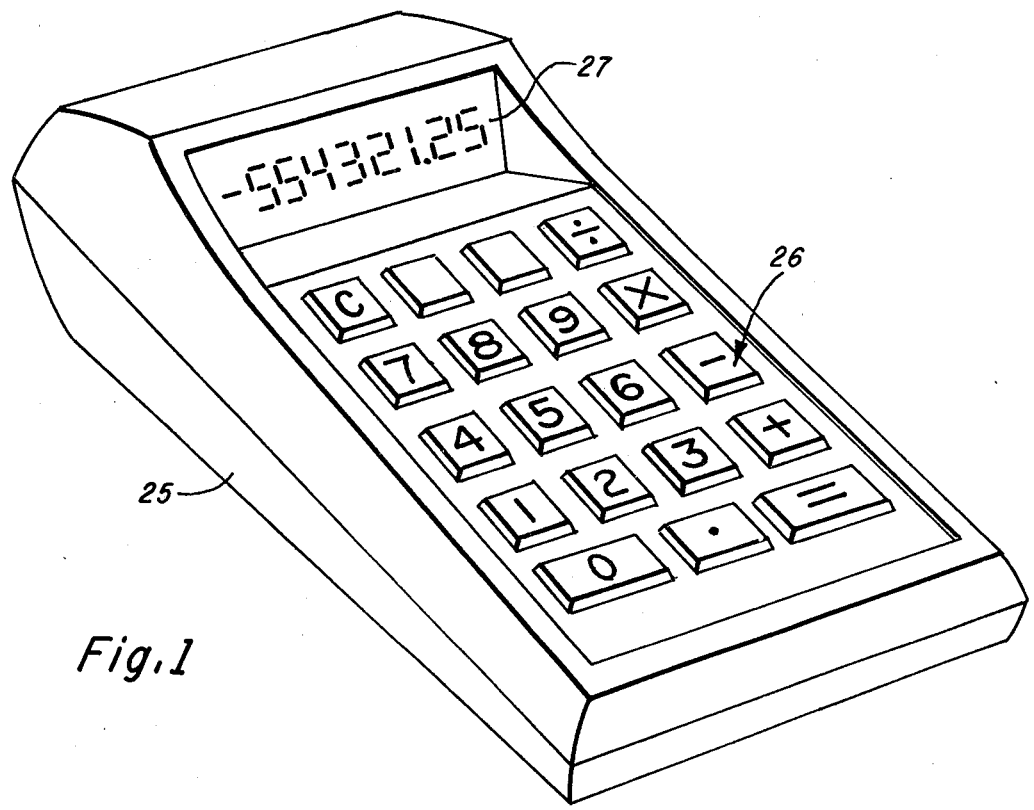
FIG. 1 is a perspective view of an electronic calculator embodying the invention.

The calculator manufactured according to this invention is designed primarily for use in a hand-held, battery powered, pocket-size version as is generally shown in FIG. 1, although the invention is operable with larger desk model calculators as well. The calculator substrate or carrier, upon which the electronics comprising the electronic calculator is disposed, is contained within a small housing 25, typically of molded plastic, and includes a keyboard 26 having 10 decimal number push-buttons, 0 to 9, along with a decimal point push-button and a plurality of function push-buttons such as, for example, plus (+), minus (−), equals (=), multiply (×), divide (÷), clear (c), and the like. A display 27 is provided in the form of matrices of light-emitting diodes (LED) e.g., 21 (FIG. 8b), liquid crystal devices (LCD), or the like. While the calculator shown in FIG. 1 depicts a display having 8 digits plus a 9th "annotator" digit for minus sign, error or overflow, and 19 keyboard push-buttons it is understood that the numbers of such digits and push-buttons are design choices.

Figure 3:
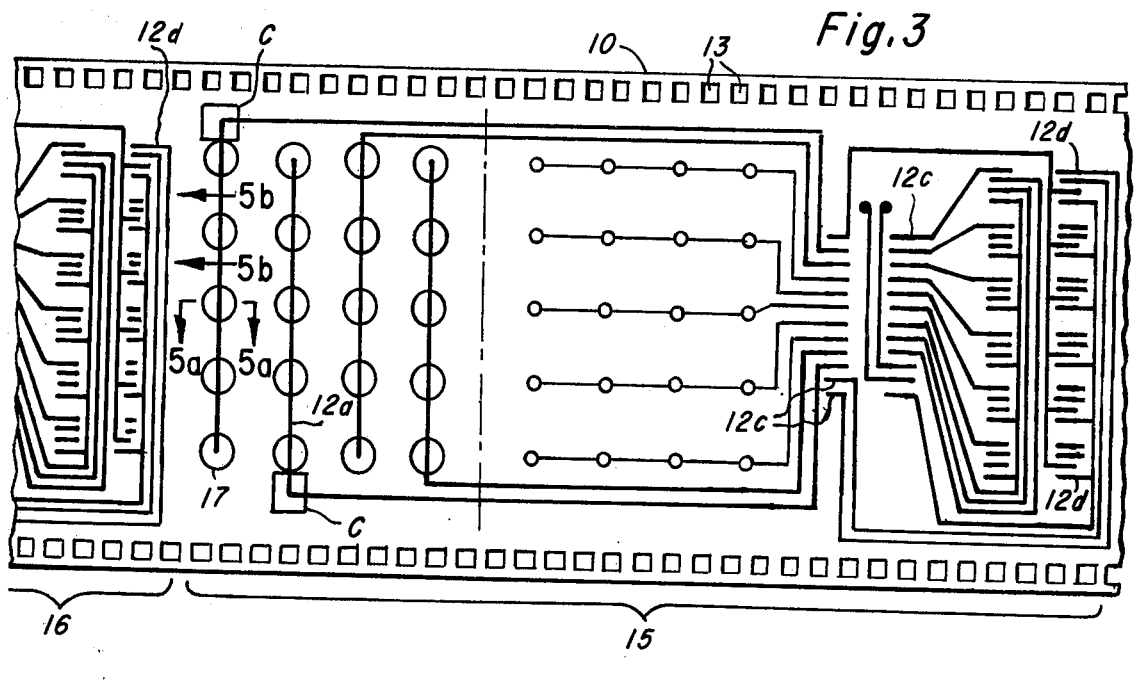
FIG. 3 depicts a portion of the carrier upon which an electronic calculator circuit is assembled showing the conducting strips formed thereon.
Figure 2:
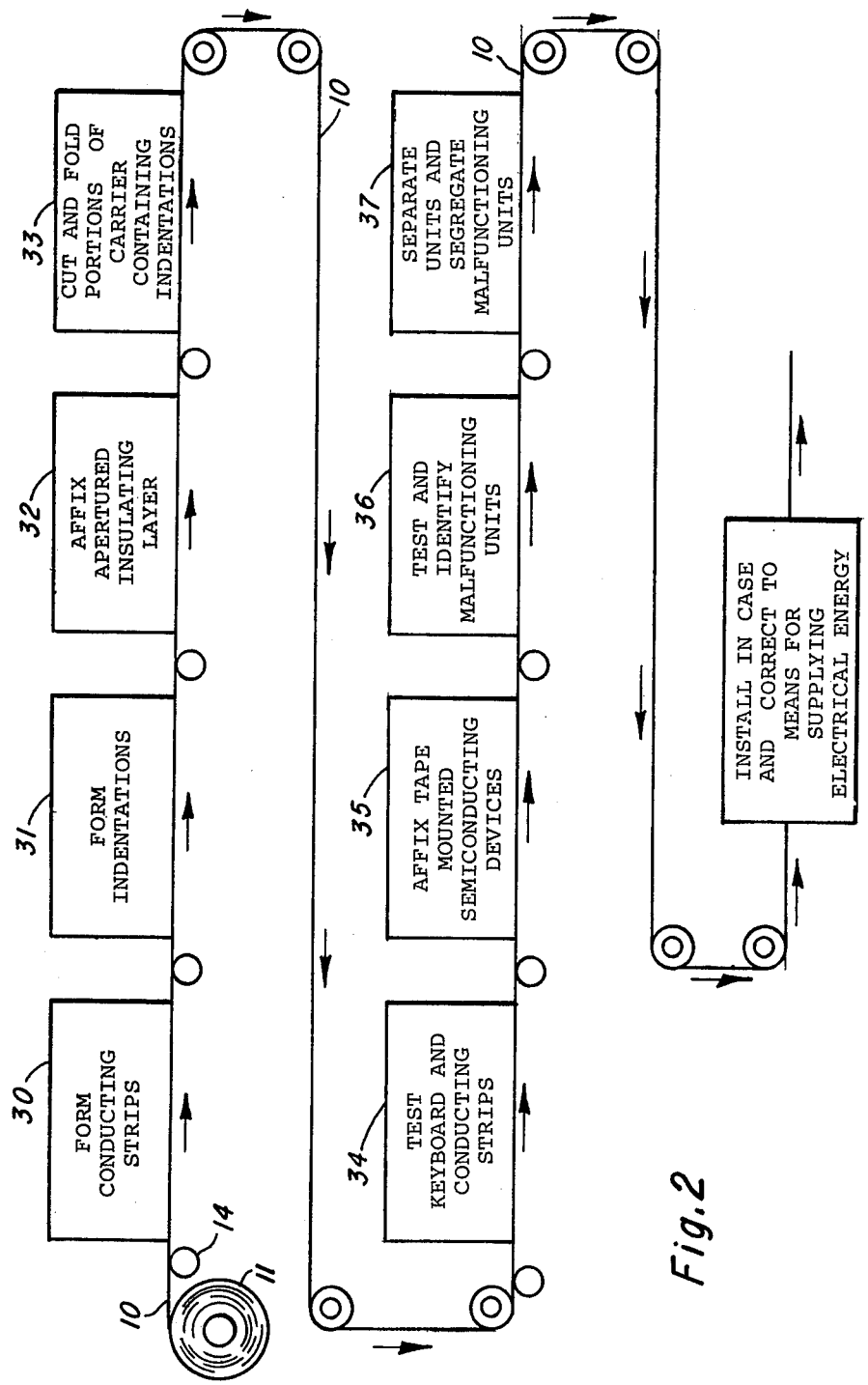
FIG. 2 is a composite illustrating the method of manufacturing an electronic calculator disclosed herein.

Referring now to FIG. 2, there is shown, in representative form, a mass production assembly or fabrication line for manufacturing an electronic calculator circuit in accordance with the method herein disclosed. A flexible substrate or carrier 10 is shown being uncoiled from a coil 11; the carrier 10 may be, for example, an organic film such as polyester sold under the trade name Mylar by the Dupont Company or a polymide sold under the trade name Kapton by the Dupont Company, and having a thickness of about 3–50 mils, but preferably 5–10 mils. The carrier 10 is equipped with a series of registration holes 13 (FIG. 3) disposed along one or both margins of the carrier 10. The carrier 10 is caused to move along the fabrication line by a series of sprocketed spindles 14 having teeth (not shown) engaging the carrier registration holes 13 (FIG. 3). These registration holes 13 and spindles 14 help to position the carrier precisely during subsequent manufacturing steps.

The first step in the fabrication process is depicted by Box 30 and comprises forming conductor patterns on the carrier 10. Referring to FIG. 3, a section of carrier 10 having registration holes 13 therein is depicted. An entire pattern 15, comprising the conducting stripes 12 such as that used in one electronic calculator, and a portion 16 of a similar pattern of conductors 12 are shown after being formed on the carrier 10, it being understood that the carrier would typically contain a plurality of such patterns 15. Methods of forming conductive strips 12 on a substrate such as carrier 10 are well known in the art, for example conducting strips 12 may be formed by selectively screening on a conductive ink such as that sold under the trade name LTC 1000 by Methode Development Co. or, for example, by adhesively laminating a conductive layer, such as, for example, a layer of copper, applying and imaging a layer of photoresist and subsequently etching away the copper from all areas except where conducting stripes 12 are desired to be located. In the preferred embodiment of this process, however, the conducting strips 12 are formed on the carrier by hot die stamping. To hot die stamp the pattern 15 of conducting strips 12 on the carrier 10, a sheet of a conductor, such as copper, having a thickness of approximately 1 mil, is affixed with an adhesive to the carrier 10 by using a die, cut with the desired pattern 15, heated to a temperature of 85° C to 130° C and pressed against the sheet conductor for 150 milliseconds to 3 seconds under approximately 200 psi pressure if the carrier is polyester. These times, temperatures and pressure are exemplary and, of course, other times, temperatures and pressures will be found to be operable and within the spirit and scope of this invention. A commercial grade polyester adhesive is applied either to the carrier or the sheet conductor before the hot die stamping operation. Hot die stamping is preferable to either the use of inks or substrative conductor etching because (1) it can be more accurately controlled dimensionally than a screening process, e.g., the use of inks, and (2) it is more amenable to continuous production line use than conductor etching which requires submergence in chemicals for a comparatively long period of time.

Referring again to FIGS. 2 and 3, the carrier including pattern of conducting strips 12, according to step 31, have a group of indentations 17 formed in the carrier 10.

Figure 5A:
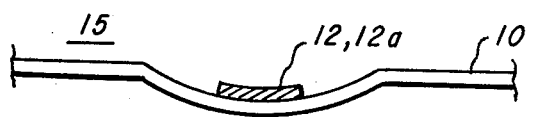
FIGS. 5a and 5b are sectional side views through an indentation formed on the carrier.
Figure 5B:
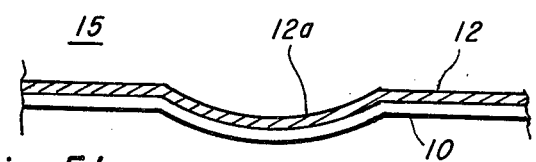

A cross sectional view through the carrier 10 in the area of indentation 17 is shown in FIGS. 5a and 5b, where FIG. 5a depicts a conducting strip 12 running perpendicular to the section and where FIG. 5b depicts a conducting strip 12 running parallel to the section, as is shown in FIG. 3. Conducting strips 12a in way of the indentation will subsequently form keyboard switch contacts. The indentations 17 are formed in the carrier preferably by thermally forming the carrier 10 with the desired indentation pattern at a temperature of approximately 115° C and under a pressure of approximately 30 lbs. per square inch in the event of the use of polyester carrier material. Alternatively, the indentations 17 in carrier 10 can be formed by die forming, vacuum forming or cold forming.

Figure 6:
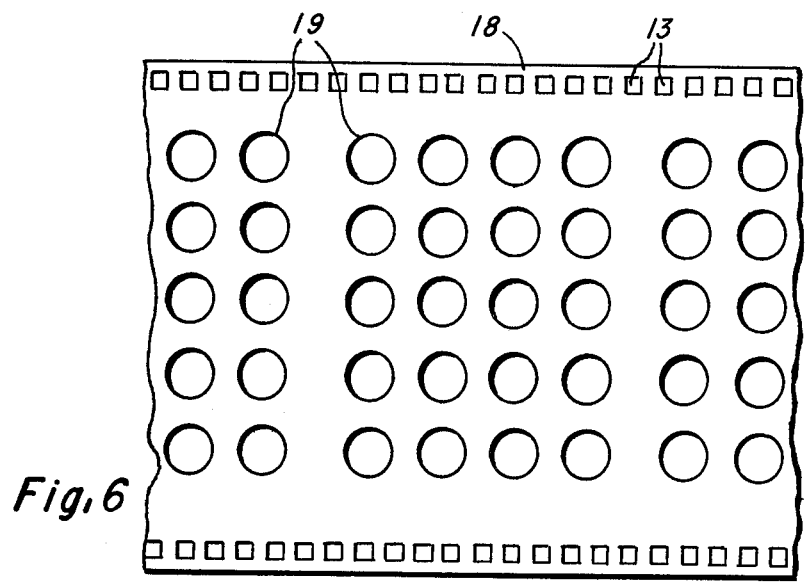
FIG. 6 depicts an insulating layer which may be used in forming the keyboard on the carrier.

As can be seen from FIGS. 3 and 4, part of the carrier 10 for each pattern 15 is folded back in later steps to form a keyboard. Depending on the configuration of conducting strips 12 formed in this area, undesirable interconnections could result, unless, for example, an insulating medium is used. In FIG. 3, reference C denotes at least those areas which should be covered by an insulating medium, such as, for example, screening a non-conductive cement in place to prevent undesired connections occuring in the keyboard conducting stripe pattern shown in that figure. Alternatively, according to the numeral 32 step (FIG. 2), a thin flexible insulating layer 18 (FIG. 6), which, for example, may be from the same type of material as carrier 10 is made, having a group of apertures 19 therein generally conforming to the locations of the indentations 17 in the carrier 10, is affixed to the carrier 10. As is shown in FIG. 6, the insulating layer 18 with hole forming apertures 19 is also provided with registration holes 13 along one or more of the margins thereof and comprises a long tape of such insulating layers 18. The carrier 10 and the tape of insulating layers 18 are brought in close proximity to each other and the insulating layers 18 are attached such that the apertures 19 in the insulating layer 18 properly register with the indentations 17 in the carrier 10. As the insulating layers 18 are affixed to the carrier 10 they are individually cut from the tape comprising the insulating layers 18, leaving the margin areas containing the registration holes 13 behind as waste, if desired. The insulating layers 18 are attached to the carrier 10, for instance, by thermal or adhesive bonding.

While the use of a tape of insulating layers 18 is considered to be the preferred method of manufacturing the calculator, the use of a tape of insulating layers 18 or the use of an insulating medium at Reference C areas may not be employed if, for example, conducting strips 12 are formed on both sides of the carrier 10.

Figure 4A:
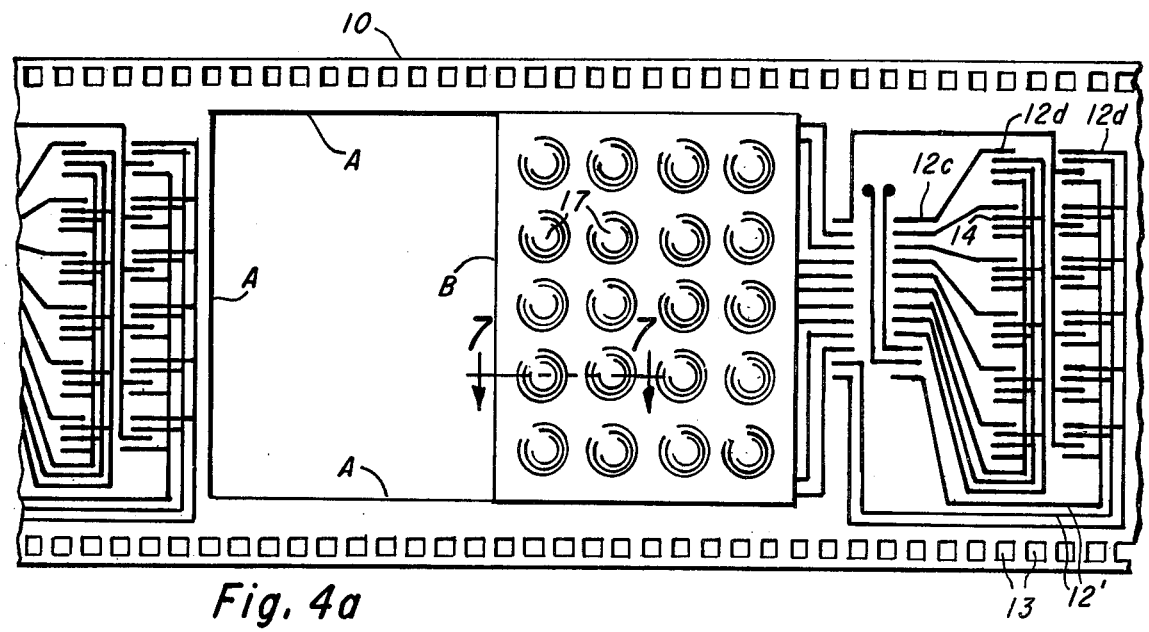
FIG. 4a depicts a portion of the carrier upon which an electronic calculator circuit is assembled, showing the conducting strips and keyboard formed thereon.

Referring again to FIG. 2, in step 33 the carrier 10 is cut along Reference A as is shown in FIG. 4a for each pattern 15 (FIG. 3) of conducting stripes and the portions of the carrier 10 containing the group of indentations 17 are then folded along Reference B, as is shown in FIG. 4a, and the surfaces coming in contact during the folding operation are affixatively attached. The group of indentations 17 now appear as a group of protuberances 17 as is more clearly shown in FIG. 7.

Figure 7:
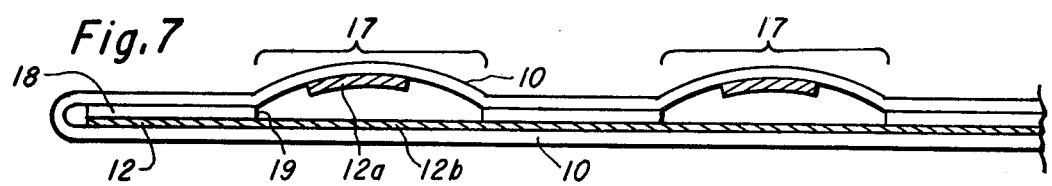

In FIG. 7 a side sectional view through a keyboard switch contact is shown wherein the carrier has been folded over, portions of the insulating strips 12a and 12b forming switch contacts 12a and 12b, and the indentations 17 now being turned over to appear as protuberances 17. The carrier 10 portion containing the protuberances 17 is affixatively attached to overlaid portions of carrier 10 or insulating layer 18, as the case may be, by, for instance, thermal or adhesive bonding. As an alternative embodiment, the portion of the carrier 10 folded back at this step may be provided with no indentations and the indentations may be provided in the portion of the carrier 10 with which the folded back portion mates.

Figure 4B:
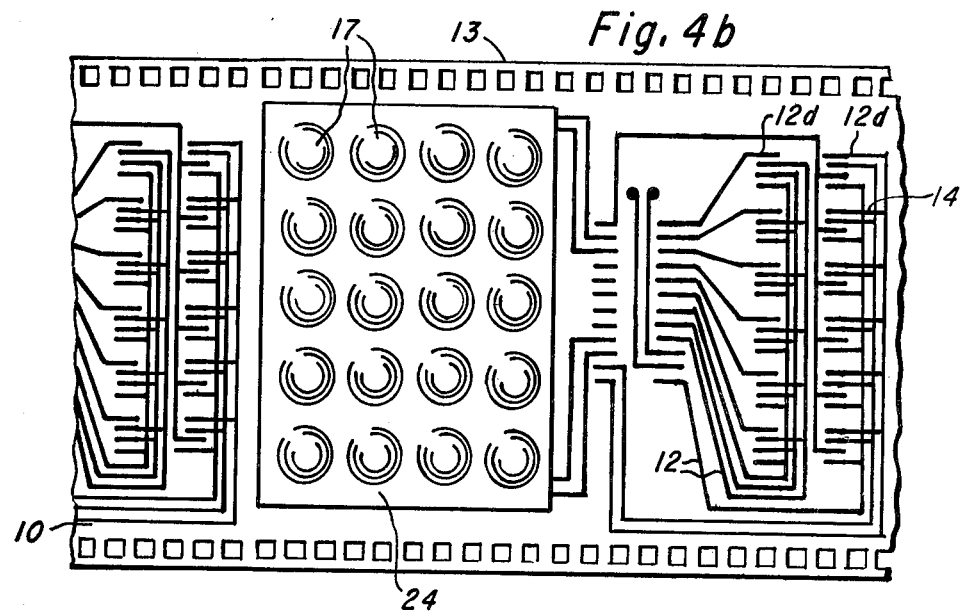

In lieu of folding back a portion of the substrate during forming the keyboard, a separate piece of flexible insulating sheet 24 having conductors affixed thereto may be bonded to carrier 10. The indentations may be provided either in carrier 10 or sheet 24. This embodiment is shown in FIG. 4b. We prefer to use a folded back portion of the carrier 10 in forming the keyboard, however, to alleviate any need for forming conductor interconnections between the carrier 10 and insulating sheet 24.

The various conductive patterns and keyboards may then be tested, accoding to numeral step 34, of FIG. 2, for example, by applying electrical probes to selected conducting strips 12 and depressing selected keys, formed by the protuberances 17 and associated switch contacts 12a and 12b, to test for proper operation of the keyboard. Should a keyboard on the carrier fail the test, the pattern 15 of the carrier 10 enclosing the defective keyboard may then be marked, for example, by punching a hole at a predetermined location in the area of the pattern is so that subsequent assembly steps will not be accomplished on an area of the carrier including a defective keyboard.

Then, according to step 35 of FIG. 2, tape mounted semiconducting logic devices 20 and display devices 21 (FIGS. 8a and 8b) are then brought in close proximity to the carrier 10, the leads 24 of the tape mounted semiconducting logic devices and display devices being electrically connected to predetermined conducting strip contacts 12c or 12d (FIG. 3). The tape mounted semiconducting logic devices 20 and display devices 21 may comprise, for example, MOS logic chips and LED's or LCD's. Tape mounted devices are well known in the art and are disclosed in U.S. Pat. Nos. 3,689,991 and 3,763,404.

Figure 8A:
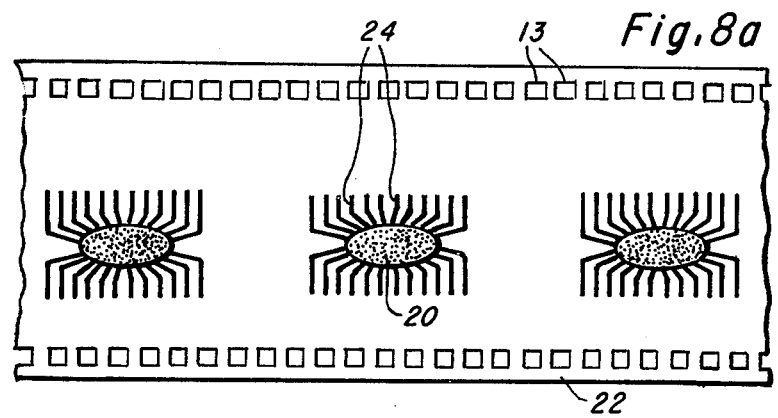
FIGS. 8a and 8b show typical tape-mounted semiconducting devices.
Figure 8B:
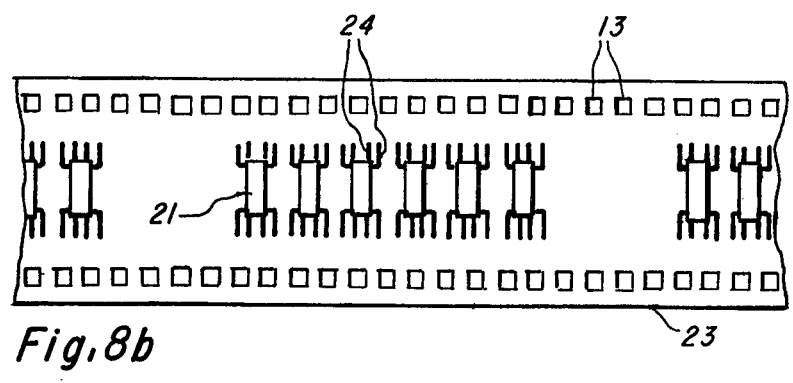

Using the tape mounted display services 21 depicted in FIG. 8b generally required multi-layering of the conducting stripes in the area of the display. Referring again to FIGS. 3 and 4a, in FIG. 3 the conductors in the area where the display devices are to be mounted are shown before multi-layering. In FIG. 4a, the conductors in the area where the display devices are to be mounted are shown after multi-layering. Thus, the added conductors 14 pass over selected conductors 12' without making an electrical connection. This is accomplished, for instance, by screening down a non-conductive element over the selected conductors 12' to inhibit an electrical connection to the added conductors 14. Of course, certain inter connections between the added conductors 14 and the other conductors 12 or 12' in the area where the display devices will be mounted are desired, so in those areas no non-conducting cement is applied. The added conductors 14 may be formed, for instance, by screening down a conductive ink such as that sold under the trade name LTC 1000 by Methods Development Co. It should be evident that use of the tape mounted display device having lead carried different distances from the axis of the device, such as the tape mounted display device disclosed by U.S. patent application Ser. No. 678,102 filed Apr. 19, 1976, can eliminate the need for using multi-layered conductors.

The tape mounted device leads 24 are elctrically connected to selected portions of the conductive strips 12c and 12d (FIGS. 4a and 4b) by, for example, ordinary soldering, reflow soldering, or electrically conductive cement such as that sold under the trademark Ablebond 773-2 BRS by Ablestik Labs, Ablestik Adhesive Co., of Gardina, California. Soldering and reflow soldering are processes well known in the art.

In using soldering processes, soldering must be performed carefully, especially for a carrier 10 made from polyester which typically does not withstand well temperatures exceeding 160° C. Using a conductive cement has the advantage of involving a lower temperature than soldering, but conductive cement bonded semiconductive devices may require more time to bond than solder bonded semiconductive devices and it further may be more difficult to replace a conductive cement bonded semiconductive device than a solder bonded semiconductive device, depending on the cement selected. If the aforementioned cement is utilized however, faulty components can be removed with a heated knife.

Additionally, when devices 20 and 21 are electrically connected to the conducting strips 12c and 12d, as aforementioned, excess portions of the tapes 22 and 23, for instance, those portions containing the registration holes 13, are cut away and discarded. In order to help assure that a malfunctioning semiconducting device is not electrically connected to the conducting strips making up a functioning keyboard and conductor pattern, devices 20 and 21 supported by tapes 22 and 23 may be pretested, and malfunctioning devices marked in such a manner that they will not be electrically connected to the conducting strips 12c and 12d. This marking may be accomplished, for instance, by punching a hole in the tape 22 or 23 near the malfunctioning device, which hole is sensed by machinery bringing the tapes 22 and 23 into close proximity with the carrier 10, causing the machinery to skip and discard the malfunctioning device.

Referring again to FIG. 2, at step 36, as each device 20 and 21 is affixed, the circuit on the carrier 10 is tested assuring that each device is being properly integrated onto the carrier 10. Should a circuit mounted on a portion of the carrier 10 fail a test, the aforementioned marking technique may be again employed to signal to machinery down the fabrication line that the calculator circuit associated with the mark is inoperable. This testing step may be accomplished after each device 20 and 21 is attached to the carrier 10 or may be accomplished after all devices have been attached.

Figure 9:
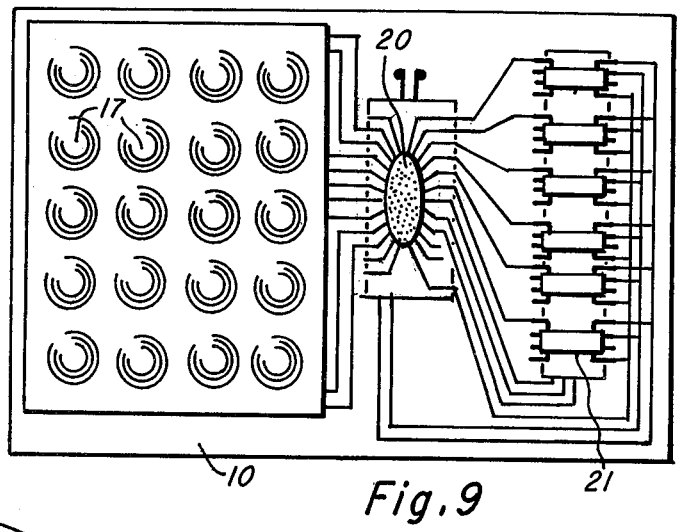
FIG. 9 depicts a calculator implemented on the carrier, separated into individual units and ready to be installed in a case.

As is shown at step 37 in FIG. 2, after all the circuit components have been integrated onto the carrier as aforementioned, the carrier is separated into individual calculator circuits and malfunctioning units segregated from operating units, using the aforementioned marks to key the segregation. Methods for accomplishing such separation and segregation are well known or evident to one trained in the art. A calculator circuit implemented on carrier 10, as separated into an individual unit and having margin areas containing registration holes removed, is shown in FIG. 9.

The registration holes 13, shown in the various carriers 10, tapes 22 and 23 and layers 18, make the process disclosed automable and make the positioning of devices 20 and 21 and the layers 18 controllable to a pecision necessary to assure proper registration between the leads 24 on the tapes 20 and 21 and the conducting strips 12c and 12d on the carrier 10 and between the apertures 19 in the layers 18 and the indentations 17 in the carrier 10. The movement and registration between the aforementioned components is controlled, for instance, by spindles 14 associated with machinery handling the carrier 10, tapes 20 and 21 and the tape of insulating layers 18. Only the spindles 14 associated with the carrier 10 are shown in FIG. 2.

As can be seen from FIGS. 3, 8a and 8b, the orientation of devices 20 and 21 on the tapes 22 and 23 and the orientation of the predetermined conducting strip contacts 12c and 12d suggest that the paths of the tapes 22 and 23 could be disposed at right angles to the path of the carrier 10. Proper registration between the leads on the devices 20 and 21 and the strip contacts 12c and 12d does not depend on the fact that the tapes 22 and 23 approach the carrier 10 at a right angle; the tapes 22 or 23 may approach the carrier 10 from a direction parallel to the path of the carrier 10 (or another angle), for instance, so long as the respective devices 20 and 21 are properly oriented thereon. Similarly, the direction which the tape of insulating layers 18 approaches the carrier 10 is not critical.

Figure 10:
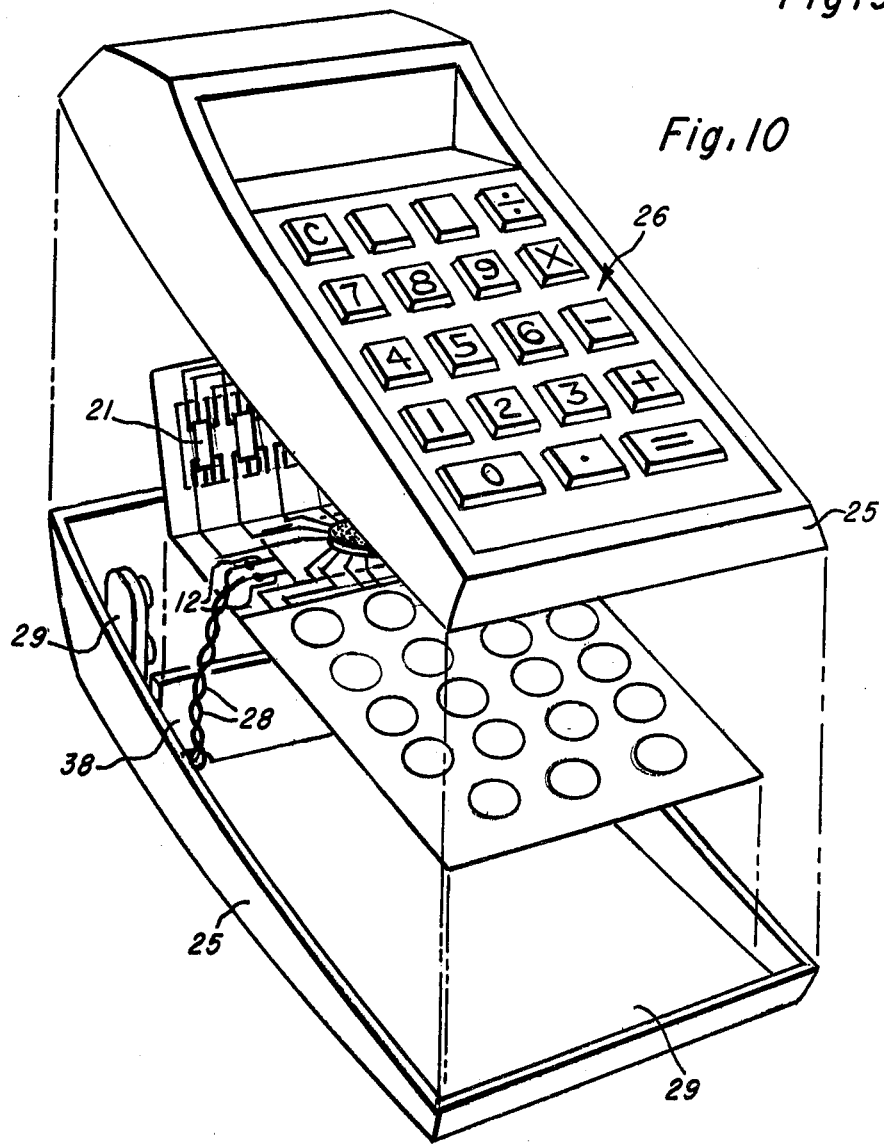
FIG. 10 is an exploded perspective view of the calculator implemented on a carrier being located in a calculator case and interconnected with a source of electrical energy.

After separation the circuits are readily installed in a case 25 and connected to a source of electrical energy such as means for connection to a battery or to conventional AC power, thereby completing an electronic calculator. Referring now to FIG. 10, there is shown an exploded view of the calculator manufactured on a flexible carrier 10 being disposed in a case 25, having by pushbuttons 26 forming a keyboard in conjunction with the protuberances 17 and associated switch contacts 12a and 12b (FIG. 7) disposed on carrier 10. The circuit formed on carrier 10 is interconnected with leads 28 connecting with battery connector 29. Leads 28 may be interconnected with selected conducting stripes 12, for instance, by soldering, reflow soldering or a conductive cement. The calculator case 25 should include a keyboard support surface 29 for supporting the key switches during switch operation. The calculator case 25 may include means such as support surface 38, for disposing that portion of the carrier 10 including the display devices 21 at an angle to the portion of the carrier including the keyboard to improve the viewability of the display 21 to an operator.

Having described the invention in connection with certain specific embodiments thereof, it is to be understood that further modification may now suggest itself to those skilled in the art. It is understood that the invention is not to be limited to the specific embodiments except as set forth in the appended claims.

What is claimed:
1. A method of manufacturing an electronic calculator comprising:
    (a) forming a pattern of conducting stripes on a flexible substrate;
    (b) forming a plurality of indentations in said substrate intersecting selected portions of said conducting stripes in said pattern;
    (c) folding a portion of said substrate back on itself to form a keyboard utilizing the indentations and selected conducting stripes as keyboard switches; and
    (d) connecting a tape-mounted semiconducting device and a display device to said flexible substrate.
2. The method of claim 1, wherein the pattern of conducting stripes is formed on the flexible substrate by hot die stamping.
3. The method according to claim 1, wherein the flexible substrate comprises polyester film.
4. The method according to claim 1, wherein the flexible substrate comprises polyimide film.
5. The method according to claim 1, wherein the flexible substrate includes a series of registration holes disposed along at least one of the margins thereof.
6. The method according to claim 1, wherein the pattern of conducting stripes is formed on the flexible substrate by selectively screening a conductive ink on the flexible substrate.
7. The method according to claim 1, wherein the plurality of indentations are formed in the substrate by thermally stamping the substrate.
8. The method according to claim 1, wherein the plurality of indentations are formed in the substrate by vacuum forming.
9. The method according to claim 1 wherein a plurality of substantially identical patterns of conducting stripes are formed on the flexible substrate.
10. The method according to claim 9, further including the step of separating said patterns including keyboards and semiconducting devices one from another after the step of folding a portion of the substrate back on itself.
11. The method according to claim 1, wherein the portions of the substrate folded back contain at least one of the indentations formed in the flexible substrate.
12. The method according to claim 1 wherein the display device connected to the flexible substrate is also tape mounted.
13. The method according to claim 1, further including the step of affixing an apertured insulating sheet to said substrate in areas where said substrate is folded back upon itself.
14. The method according to claim 13 wherein said apertured insulating sheet is affixed to said substrate by adhesive bonding.
15. The method according to claim 1, wherein the semiconducting devices and the display device are connected to the flexible substrate by soldering the leads from said semiconducting device and said display device is selected conducting stripes formed on said flexible substrate.
16. The method according to claim 1, wherein said semiconducting device and said display device are connected to said flexible substrate by adhesively bonding the leads of said semiconducting device and said display device to selected conducting stripes formed on said flexible substrate using an electrically conductive cement.
17. The method according to claim 1 further including the steps of testing the partially assembled electronic calculator and of marking partially assembled electronic calculators failing a test.
18. A method of manufacturing an electronic calculator comprising:
    (a) forming a pattern of conducting stripes on a flexible substrate;
    (b) forming another pattern of conducting stripes on an insulating sheet;
    (c) forming a plurality of indentations in at least one of said substrate and said sheet, said indentations intersecting selected portions of said conducting stripes;
    (d) bonding said sheet to said substrate, selected conducting stripes on said substrate being registered with selected conducting stripes on said sheet; and

(e) connecting a tape-mounted semiconducting logic device and a display device to said flexible substrate.

19. A method of manufacturing an electronic calculator comprising the steps of:
(a) forming a pattern of conductive stripes on a flexible substrate;
(b) connecting the leads from a tape-mounted semiconducting logic device to selected conducting stripes on said substrate;
(c) connecting selected conducting stripes on said substrate to a keyboard means; and
(d) connecting selected conducting stripes on said substrate to a display device.

20. The method according to claim 19, wherein said flexible substrate is a plastic material selected from the group consisting of a polyester and polyimide plastics.

21. The method according to claim 19, wherein said display device is also tape-mounted.

22. The method according to claim 19, wherein said flexible substrate is provided by flexible plastic material and the pattern of conducting stripes is formed on said flexible material at a plurality of locations along a length of said flexible material, whereby said pattern repeats along the length of said flexible plastic material.

23. The method according to claim 22, wherein said display device is also tape-mounted.

24. The method according to claim 1, wherein said flexible substrate is provided by a length flexible material and the pattern of conducting stripes is formed on said flexible material at a plurality of locations along said length of flexible material, whereby said pattern repeats along the length of said flexible material.

25. The method according to claim 24, further including the step of severing said substrate between said patterns and wherein the step of folding said portion is accomplished prior to said severing step.

26. The method according to claim 25, wherein said display device is also tape-mounted.

* * * * *